No. 12,634. REISSUED APR. 16, 1907.
F. OTT.
SHUTTLE.
APPLICATION FILED JULY 5, 1906.
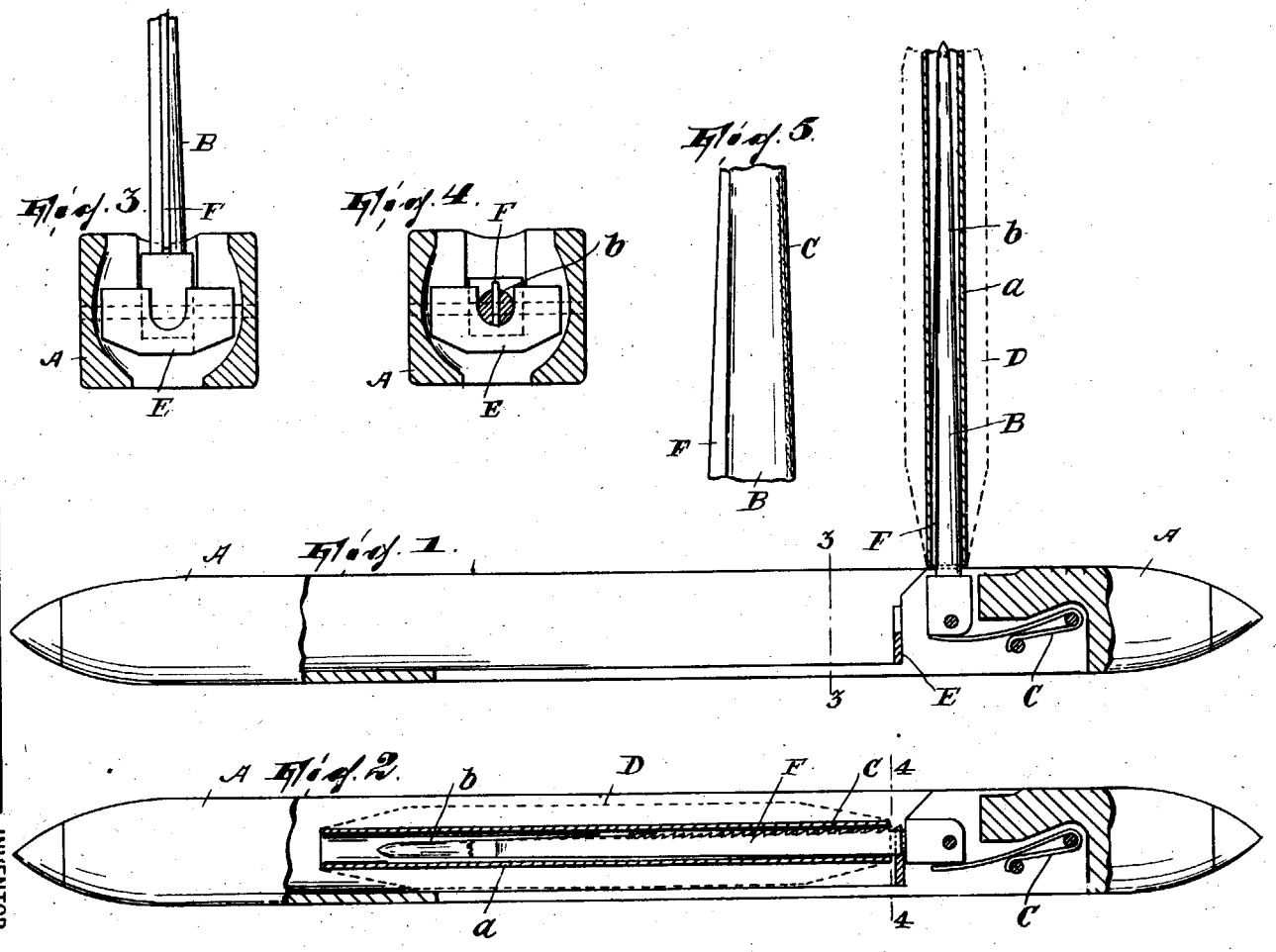
WITNESSES:
Wm. S. Nell.
A. Glatt.
INVENTOR,
Frederick Ott,
BY
Arthur Serrard,
ATTORNEYS

UNITED STATES PATENT OFFICE.

FREDERICK OTT, OF WOONSOCKET, RHODE ISLAND, ASSIGNOR TO ISAAC A. HALL, OF PATERSON, NEW JERSEY.

SHUTTLE.

No. 12,634. Specification of Reissued Letters Patent. Reissued April 16, 1907.

Original No. 808,474, dated December 26, 1905. Application for reissue filed July 5, 1906. Serial No. 324,886.

*To all whom it may concern:*

Be it known that I, FREDERICK OTT, a citizen of the United States, residing at Woonsocket, in the county of Providence and State of Rhode Island, have invented new and useful Improvements in Shuttles, of which the following is a specification.

My invention pertains to shuttles; and it consists in the peculiar and advantageous construction hereinafter described, and particularly pointed out in the claims appended.

In the accompanying drawings, forming part of this specification, Figure 1 is a view, partly in side elevation and partly in vertical section, of a shuttle embodying my invention, the same being shown with its spindle raised to permit of a cop being placed on or removed from the same with facility. Fig. 2 is a similar view with the spindle lying entirely in the body of the shuttle and the coacting devices for preventing casual displacement of the cop in engagement with each other. Fig. 3 is an enlarged detail transverse section taken in the plane indicated by the line 3 3 of Fig. 1. Fig. 4 is an enlarged detail transverse section taken in the plane indicated by the line 4 4 of Fig. 2, and Fig. 5 is an enlarged detail side elevation of the spindle with the cop-engaging strip of my improvements in its normal position relative to the spindle.

Similar letters designate corresponding parts in all of the views of the drawings, referring to which—

A is a shuttle-body which in general may be of the ordinary or any other construction compatible with the purposes of my invention.

B is a spindle pivoted in the shuttle-body in the ordinary or any other approved manner and designed to be retained against casual movement in the two positions shown in Figs. 1 and 2 by a spring C, and D (see full and dotted lines in Figs. 1 and 2) is a cop removably arranged on the spindle and provided with a paper or other tube *a*.

My invention consists in providing the spindle with a resilient toothed or serrated strip extending longitudinally of the spindle and adapted with its teeth or serrations when the tube is on the spindle, to engage the inside or bore thereof, whereby to hold said tube against slipping off the spindle and also to stand out of engagement with said tube to permit the latter to be freely removed.

My invention further consists, in combination with the spindle and such resilient toothed or serrated strip arranged therein, of a means for causing movement of the strip in the spindle when the spindle is moved.

In the construction shown by way of illustration in the drawings the resilient strip F is fixed at its outer end in a slot *b* of the spindle, is gradually increased in width toward its inner free end, and is arranged to normally rest in the position best shown in Fig. 5 relative to the spindle, this latter with a view of enabling the spindle to guard its toothed or serrated edge *c* when the spindle is in the upright position. (Shown in Fig. 1.) With the spindle resting in the position last mentioned it will be observed that a cop may be placed on or removed from the spindle without the strip F offering resistance to such operations. When, however, the spindle with a cop thereon is swung down into the shuttle-body A, as shown in Fig. 2, the inner end of the strip F will bring up against the plate E with the result that the serrated edge of said strip F will be forced beyond the side of the spindle and will positively engage the tube of the cop, and thereby preclude loosening or displacement of the cop so long as the spindle remains in the position shown in Fig. 2 relative to the shuttle-body. This will be appreciated as an important advantage when it is remembered that a cop casually leaving a spindle during the operation of weaving invariably breaks the thread, stops the loom, and when the loom is started, unless great care is taken, frequently gives rise to thick or thin places in the cloth and lessens the value of the same. While the strip F will preclude casual loosening or displacement of the cop while the spindle is in the position shown in Fig. 2, it will be observed that when the spindle is moved to the position shown in Fig. 1 the strip F will resume its normal position relative to the spindle, Figs. 1 and 5, and the cop may then be readily removed from the spindle and as readily replaced with another cop.

Notwithstanding the material advantages following from the use of my improvements it will be readily appreciated that the improvements are very simple and inexpensive, and hence add but a minimum to the cost of a shuttle; also, that the improvements do not in any measure increase the work necessary to the proper operation of the shuttle.

It will be gathered from the foregoing that when the resilient strip F is in engagement with the stop E the said strip is held under tension in such position that its toothed edge engages the cop-tube on the spindle; also, that when the spindle is swung upwardly the strip F springs into the position shown in Figs. 1 and 5, with its plain edge yieldingly projecting from the slot.

Having thus fully described my invention, what I claim, and desire to secure by Letters Patent, is—

1. In a shuttle, the combination of a body, a longitudinally-slotted spindle pivoted therein, a resilient strip having a plain longitudinal edge and an opposite longitudinal edge provided with teeth; said strip being secured at its outer end in the outer end of the slot of the spindle and in such position with respect thereto as to hold the inner portion of its plain edge yieldingly projected from the slot when the spindle has been raised or partly raised, and a stop arranged in the shuttle to engage the plain edge of the strip when the spindle has been swung downwardly and hold the toothed edge projected from the slot under tension.

2. In a shuttle, the combination of the body, a longitudinally-slotted spindle pivoted therein, a toothed strip arranged in the slot and secured fast at but one end therein whereby to be movable down into and also out of the same to sheathe and unsheathe its teeth and normally standing in one of the positions named, and means for causing the movement of the strip upon movement of the spindle in one direction, substantially as described.

3. In a shuttle, the combination of the body, a longitudinally-slotted spindle pivoted therein, a toothed strip arranged in the slot and movable down into and also out of the same to sheathe and unsheathe its teeth and normally standing in the sheathed position, and means for causing the movement of the strip into the unsheathed position upon the spindle being moved into its depressed position, substantially as described.

In testimony whereof I have hereunto set my hand this 14th day of May, 1906.

FREDERICK OTT.

Witnesses:

WM. H. MARKLE,

I. T. HARTZOG.